Jan. 13, 1925.

M. O. SCHAEFER ET AL 1,522,794

PROCESS OF TREATING CHEESE

Filed Sept. 11, 1923    3 Sheets-Sheet 1

INVENTORS:
Max O. Schaefer
BY Emil Frey
Henry T. Williams,
ATTORNEY.

Patented Jan. 13, 1925.

1,522,794

UNITED STATES PATENT OFFICE.

MAX O. SCHAEFER AND EMIL FREY, OF MONROE, NEW YORK, ASSIGNORS TO VELVEETA CHEESE COMPANY, INC., OF MONROE, NEW YORK, A CORPORATION OF NEW YORK.

PROCESS OF TREATING CHEESE.

Application filed September 11, 1923. Serial No. 662,053.

*To all whom it may concern:*

Be it known that we, MAX O. SCHAEFER and EMIL FREY, citizens of the United States, residing at Monroe, in the county of Orange and State of New York, have invented certain new and useful Improvements in Processes of Treating Cheese, of which the following is a specification.

The invention to be hereinafter described relates to a process of treating cheese.

Heretofore, cheeses have been converted into what is called remade cheese, by a process including the following steps: Various cheeses may be used, such, for example, as Swiss cheese or American cheese. These cheeses are cut into pieces which are passed through a grinding machine, which may desirably be the well known Enterprise grinder, in order to comminute the cheese. Then the comminuted cheese is placed into a container, and any of several well known chemicals may be added to assist in breaking down the casein, although chemicals are not indispensable. Then the cheese mass is subjected to heat and stirred for a predetermined length of time. When the cheese has the desired consistency and character from this treatment, it is poured into molds to form packages for commercial distribution.

The present invention is an improvement upon the aforesaid process, and produces a product of highly desirable quality and flavor. In accordance with this process, the comminuted cheese is introduced into a kettle and subjected to heat by introduction of steam directly into the cheese. It is necessary that the steam shall be dried. The steam may be dry or carry a small amount of water, but to obtain good results the steam should not carry a substantial volume of water into the cheese.

In order to remove the moisture from the steam, we have devised an apparatus which includes a system of piping for conducting the steam to the kettle containing the cheese, said piping having provision for allowing moisture or water of condensation in the steam to be carried away without entering the kettle.

It is desirable that the cheese shall be heated sufficiently to give it the desired consistency and character, but the heating effect is not continued sufficiently long or carried to a degree sufficiently high to cause pasteurization or sterilization thereof. For example, the temperature of the cheese mass may be raised to a point between 135° and 146° F. for about three minutes. To accomplish this, the steam is introduced into the kettle in the presence of a partial vacuum which is established in the kettle. The means for establishing the vacuum effect also serves to conduct the steam from the kettle, so that it continuously passes through the kettle, and this means has provision for preventing water of condensation in the steam from flowing back into the kettle.

While the cheese is subjected to the heating effect of the steam in the presence of the partial vacuum, it is thoroughly stirred throughout and opened up so as to permit the steam to be distributed therein and reach the entire cheese mass at substantially the same time, so that the cheese mass is heated uniformly throughout.

After the cheese has been subjected to this treatment, the operator examines the cheese, and when it has attained a stringy character and is of the desired consistency, the heating effect is arrested, and the cheese is poured from the kettle into a container. From the latter the cheese is poured into boxes or molds which may be lined with tin foil. Then the molds containing the cheese are weighed, and some cheese may be added or taken away, in order that the cheese placed in the mold may have the desired weight.

Then the molds containing the cheese are placed in a cooling room, and the cheeses wrapped in the foil are subjected to pressure. After the cheeses have remained in the cooling room a predetermined length of time, covers are placed on the molds or boxes, and the cheese packages are ready for shipment.

One good form of apparatus for heating the comminuted cheese by dried steam in the presence of a partial vacuum, is shown in the accompanying drawings, wherein.

Figure 1:
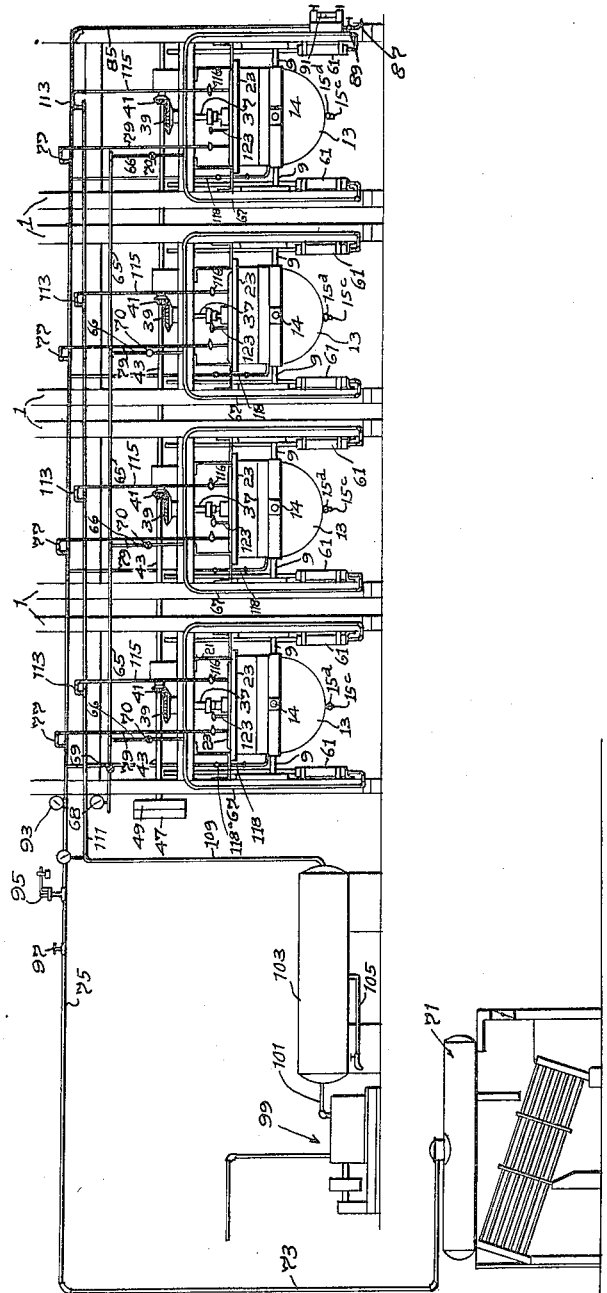
Fig. 1 is a side elevation of apparatus embodying the invention.
Figure 2:
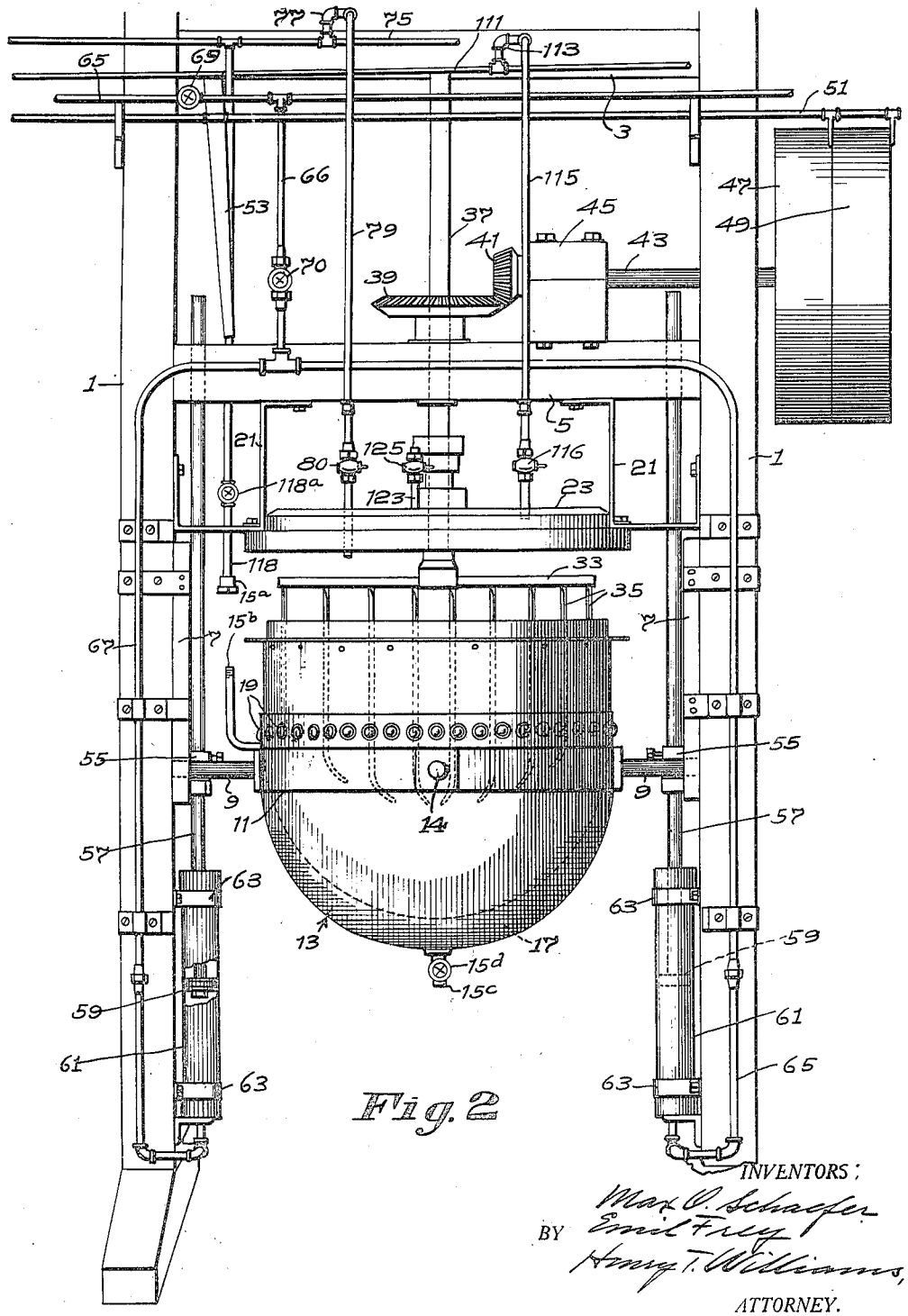
Fig. 2 is a side elevation of the kettle, its support and piping leading thereto, the body of the kettle being shown in lowered position away from its cover.
Figure 3:
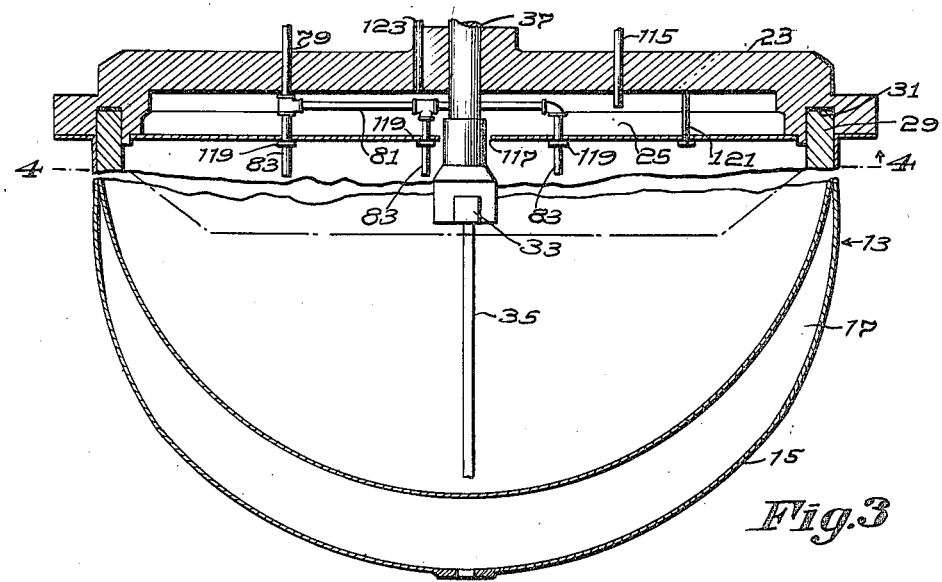
Fig. 3 is a vertical section through the cover and a portion of the body of the kettle.

Referring to the drawings, the apparatus shown therein comprises a support conveniently in the form of a frame having uprights 1 connected at their upper ends by a cross member 3, and also connected by a cross member 5 beneath and spaced from the top cross member. Secured to the uprights are guideways 7 adapted to receive trunnions 9 projecting diametrically oppositely from a band 11 embracing the body 13 of the kettle. Also projecting from the band are a pair of handles 14 adapted to be grasped in transferring the kettle to and from the truck, as more fully hereinafter described. The body desirably may have a bottom portion of substantially hemispherical form, and attached thereto is a shell 15 providing a space 17 serving as a steam jacket for the bottom portion of the kettle, said shell being secured to the body by a series of rivets 19.

Secured to the uprights and the cross member 5 are brackets 21 supporting the kettle cover 23 which has a recess 25 on the under side thereof covered by a thin disk plate 27 having its margin seated in a rabbet formed in the cover. The cover has a groove 29 in the flange thereof provided with a gasket 31 adapted to be engaged by the upper edge of the body of the kettle, in order to prevent leakage between the body and cover.

Figure 4:
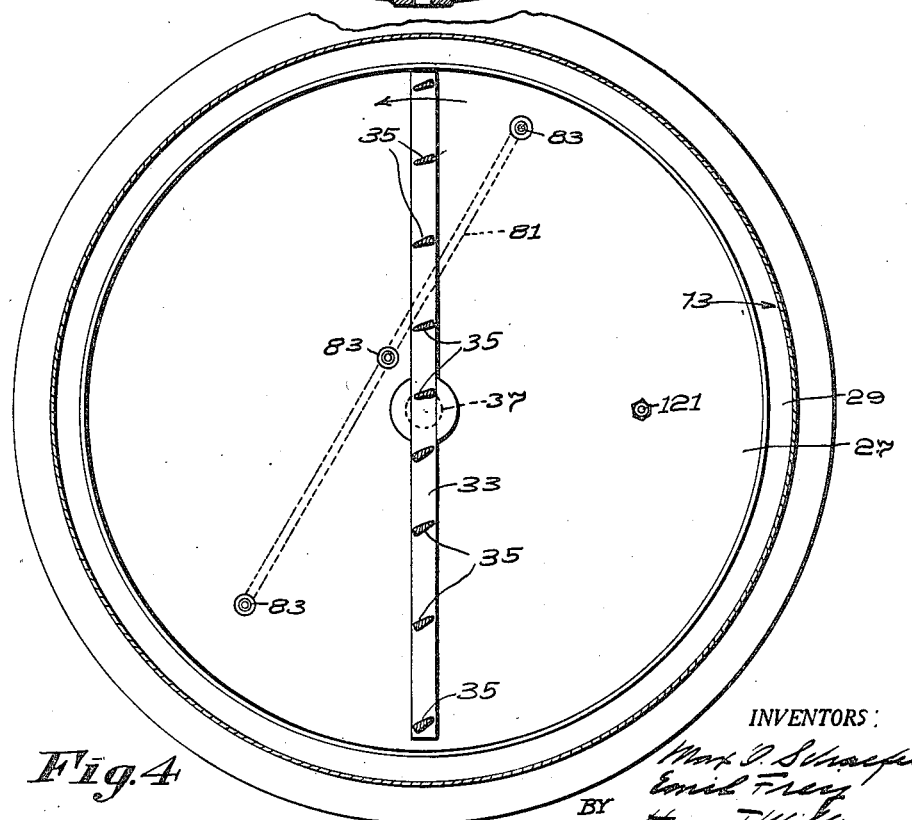
Fig. 4 is a horizontal section taken on line 4—4 of Fig. 3.

Suitable means may be provided to stir and open up the cheese mass in the kettle. This means, in the present instance of the invention, comprises a bar 33 having a series of stirrers or arms 35 depending therefrom. These arms are of a general wedge-shaped section, have lower ends curved to conform to the contour of the body of the kettle, are set on the bar in the vertical plane of the bar, and are so disposed that transversely they are oblique to the length of the bar, as will be noted in Fig. 4. Also the arms are staggered or set at varying distances apart. The construction is such that the arms will plow through and form furrows or open up the entire cheese mass in the course of each complete rotation of the stirring means, and permit the steam to enter into and reach the cheese mass uniformly throughout. When the bar and the arms are rotated in the direction of the arrow (Fig. 4), the arms will tend to throw the cheese inward toward the center of the kettle.

The bar 33 of the stirring device is mounted fast on a vertical shaft 37, which projects upward through the disk plate 27 and the cover 23, and said shaft is journalled in bearings in the cross members 3 and 5. Fast on the shaft is a bevel gear 39 meshing with a bevel pinion 41 fast on a shaft 43 journalled in a bearing 45 mounted on the cross member 5 and journalled in a bearing in one of the uprights 1. Fast on this shaft are tight and loose pulleys 47 and 49 adapted to receive a belt connected to an electric motor or other suitable source of power. A belt shifter 51 is supported by the uprights 1 and provided with a handle 53.

Suitable means may be provided to raise the body of the kettle to the cover and to lower the same therefrom. This means, in the present instance of the invention, comprises heads 55 receiving the trunnions 9 and secured to stems 57 having pistons 59 in cylinders 61 secured by straps 63 to the uprights 1. The stems may extend up through and be guided by holes in the cross member 5.

A battery of kettles such as described may be provided, and in Fig. 1 a battery of four kettles is shown. The main pipe 65 may receive hydraulic or other pressure from a suitable source, and conduct the same to branch pipes 66 connected to U-shaped pipes 67 having their lower ends connected to the bottom heads of the pairs of cylinders 61 for the kettles. The main pipe 65 is provided with a pressure gage 68 and a valve 69, and each of the branch pipes 66 is provided with a valve 70. The construction is such that when hydraulic pressure is admitted into the cylinders 61, the pistons 59 and their stems 57 will elevate the body of the kettle to the cover, so that the upper edge of the body will seat tightly against the gasket 31 in the groove of the cover. When it is desired to lower the body, the hydraulic pressure is gradually released, thereby allowing the pistons to move downward in the cylinders. The kettle is lowered a sufficient distance to enable the body of the kettle to clear the lower ends of the stirrers. Then the kettle is transferred to a truck (not shown) by which the kettle may be conveyed to the place where the cheese is poured from the kettle and formed into molds.

Steam may be supplied to the kettles from a steam boiler conventionally indicated on a small scale at 71. A main steam pipe leads from the boiler, and comprises a vertical pipe 73 and a nearly horizontal pipe 75. Projecting from the upper side of the main pipe 75 are elbows 77 of vertical pipes 79 which extend down to and project through the covers, said pipes 79 being provided with valves 80. Each of these vertical pipes 79 is connected to a horizontal pipe 81 located in the cover recess 25, and provided with three steam distributing nozzles 83 suitably located to distribute the steam into the furrows opened up in the cheese mass by the stirrer arms.

To prevent moisture in the steam from entering the kettles, the pipe 75 may have a slight inclination, such, for example, as one inch drop in ten feet, and a vertical drain pipe 85 may be connected to the pipe 75, and may have an open end 87. The pipe 85 is provided with a valve 89 and a water gage 91. The valve 89 is adjusted to provide the small opening sufficient to allow water of condensation to drip from the end 87 of the pipe, and yet cause a water column to stand above the valve and prevent escape of steam from the pipe 85.

The construction is such that moisture or water of condensation in the steam will gravitate through the pipe 75 to the drain pipe 85, and since the elbows 77 for the pipes 79 lead from the upper side of the main pipe, the water of condensation will not enter the elbows 77 and the pipes 79, and therefore, will not enter the kettles.

The main pipe 75 may be provided with a pressure gage 93, a steam regulating valve 95, and a valve 97 for controlling the flow of steam.

To produce the vacuum effect in the kettles, a vacuum pump 99 may be provided of usual construction, and may be connected by a pipe 101 with a vacuum tank 103. A drain pipe 105 is connected to the vacuum tank, and provided with a valve 107. A main pipe 109 projects upward from the vacuum tank to a nearly horizontal pipe 111 connected by elbows 113 and vertical pipes 115 with the kettle covers, said pipes 115 being provided with valves 116.

The construction is such that a vacuum effect is established in the spaces between the kettle covers and the plates 27. Each of the plates has an opening 117 somewhat larger than the stirrer shaft, and has a loose fit in the cover rabbet, so that the vacuum effect is transmitted into the body of the kettle. The steam is drawn from the kettles through the branch pipes 115 and the pipes 111 and 109 into the vacuum tank.

The steam distributing nozzles preferably have small delivery openings, such, for example, as $\frac{1}{16}''$ diameter each; and the vacuum pipe has a small opening, such, for example, as $\frac{3}{8}''$ diameter. The consequence is that the air and steam are drawn by the vacuum means slowly from the kettle, and the suction effect is not sufficiently great to prevent water of condensation from the steam from flowing to its lowest gravity point. Therefore, to prevent the condensation from flowing in the pipe 111 back into the kettle, said pipe may have an inclination, such, for example, as a drop of one inch in ten feet, in order to allow water of condensation in the steam to gravitate through the pipe 111 and into the pipe 109, and thence into the vacuum tank. From time to time the water of condensation may be discharged from the vacuum tank through the pipe 105.

To supply steam to the jacket between the shell 15 and the bottom of the kettle, a pipe 118 may lead from the steam pipe 75 down to a point adjacent the top of the kettle. Said pipe may be provided with a valve $118^a$ and may be detachably connected by a coupling $15^a$ with a short pipe $15^b$ projecting from the kettle and communicating with the jacket. Water of condensation may be drawn from the jacket through a short pipe $15^c$ connected to the shell 15 and provided with a valve $15^d$.

The disk plate 27 may be secured to the cover by suitable means, in the present instance, comprising nuts 119 on the nozzles 83 and a screw bolt 121 connected to the cover. To permit admission of atmospheric pressure into the kettle to destroy the vacuum effect, the cover may be provided with a short pipe 123 provided with a valve 125.

In the use of the apparatus, the comminuted cheese is introduced into the body of one of the kettles, and then hydraulic pressure is admitted into the cylinders 61, thereby elevating the body of the kettle to its cover. Then the vacuum escape valve 125 is closed, the steam admission valve 80 and the vacuum admission valve 116 are opened, and the belt shifter is moved to shift the belt to the tight pulley, thereby causing rotation of the stirrer. The steam admitted into the kettle is distributed by the nozzles 83 into the furrows or openings produced by the stirrer arms, and thus the steam is uniformly distributed throughout the mass of the cheese. The vacuum effect produced in the kettle enables the cheese to be sufficiently heated at a temperature sufficiently low to prevent pasteurization or sterilization of the cheese.

After the process has been carried on a sufficient length of time to produce cheese of the desired quality, the steam admission valve 80 and the vacuum admission valve 116 are closed, and the vacuum escape valve 125 is opened, thereby admitting atmospheric pressure into the kettle. Then the hydraulic pressure on the cylinders 61 is released, thereby to lower the body of the kettle from its cover. The kettle body may be tilted to pour the cheese mass into a suitable receptacle, from which the cheese may be poured into molds.

The battery of kettles may be operated in turn, so that the comminuted cheese may be introduced into the kettles and the treated cheese may be poured therefrom successively. The operations may be so timed that the operator may attend the kettles in turn.

If the temperature of the room containing the apparatus falls below a certain temperature, steam may be admitted into the jacket to contribute to heating the cheese, but if the temperature of the room is above this point, the heating by the jacket is unnecessary.

The apparatus disclosed herein is shown and claimed in my copending application Serial No. 656,714, filed August 10, 1923.

What we claim as new and desire to secure by Letters Patent is:—

1. A process of remaking cheese characterized by cutting solid cheese into pieces, grinding or comminuting the cheese, introducing dried steam into the cheese mass under a partial vacuum to heat the cheese mass, but without pasteurizing the same, stirring and opening the cheese mass to distribute the steam therein, and pouring the cheese mass in molds after it has reached a stringy consistency.

2. A process of remaking cheese characterized by introducing dried steam under a partial vacuum into a cheese mass in a closed container, stirring and opening the mass to distribute the steam therein, and pouring the cheese mass into molds.

3. A process of remaking cheese characterized by introducing dried steam into a cheese mass in a container to heat the cheese mass, stirring the cheese mass to open the same and distribute the steam therein, and drawing the steam from the container by vacuum means.

4. A process of remaking cheese characterized by placing cheese in a closed container, stirring the cheese in the container while passing dried steam through the cheese to heat the same, arresting the supply of steam to the container when the cheese has reached the desired consistency, and then placing the cheese in molds.

5. A process of remaking cheese characterized by comminuting cheese, placing the cheese in a container, conducting steam to the container, removing moisture from the steam to prevent it from entering the container, and establishing a vacuum effect in the container that the steam may sufficiently heat the cheese to give the same a smooth character without pasteurizing the cheese.

6. A process of remaking cheese characterized by comminuting cheese, placing the cheese in a container, introducing dry or substantially dry steam into the cheese in the container to heat the cheese, establishing a vacuum effect in the container while the steam is introduced therein, arresting the vacuum effect in and the supply of steam to the container, and pouring the cheese into molds lined with tin foil.

7. A process of remaking cheese characterized by comminuting cheese, placing the cheese in a container, introducing dry or substantially dry steam into the cheese in the container under vacuum effect, stirring the cheese while the dry or substantially dry steam is introduced therein, pouring the cheese into molds after it attains a smooth, velvety character, and then cooling the molded cheese.

8. A process of remaking cheese characterized by comminuting cheese, placing the cheese in a container, introducing dry or substantially dry steam into the cheese mass to heat the same, drawing the steam through and from the container by vacuum means, and preventing water of condensation in the removed steam from returning into the container.

9. A process of remaking cheese characterized by comminuting cheese, introducing dry or substantially dry steam into the cheese mass to heat the same, drawing the steam from the container by vacuum means, preventing water of condensation in the removed steam from returning into the container, and stirring the cheese mass while the steam is passing therethrough.

10. A process of remaking cheese characterized by comminuting cheese, introducing dry or substantially dry steam into the cheese mass to heat the same, drawing the steam from the container by vacuum means, preventing water of condensation in the removed steam from returning into the container, stirring the cheese mass while the steam is passing therethrough, and arresting the supply of steam to the cheese so as to prevent pasteurization thereof.

MAX O. SCHAEFER.
EMIL FREY.